March 2, 1926.  1,575,180
A. G. PERKINS
PIPE JOINT
Filed August 13, 1924
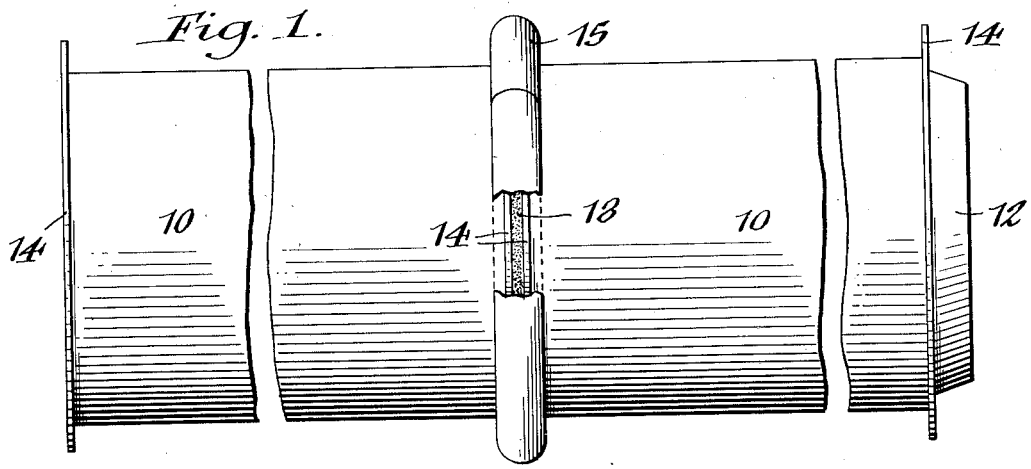
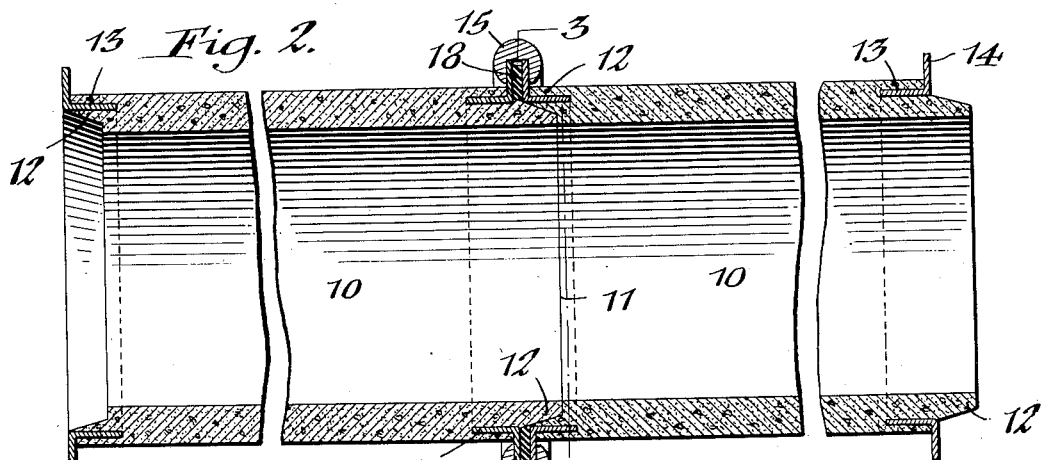
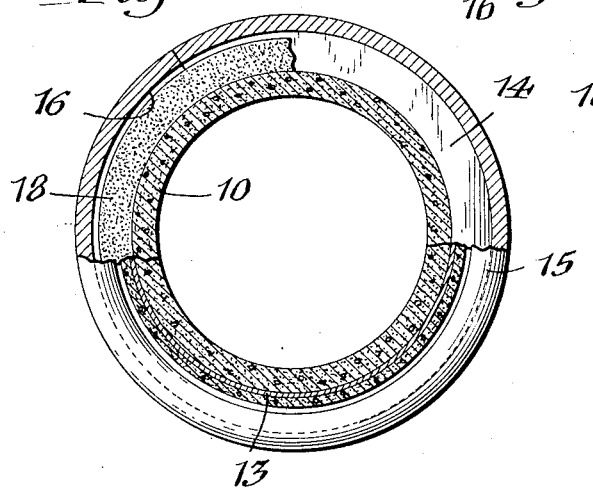
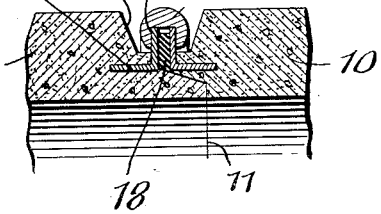
Inventor
Albert G. Perkins
by Geyer & Geyer
Attorneys.

Patented Mar. 2, 1926.

1,575,180

UNITED STATES PATENT OFFICE.

ALBERT G. PERKINS, OF BUFFALO, NEW YORK.

PIPE JOINT.

Application filed August 13, 1924. Serial No. 731,757.

*To all whom it may concern:*

Be it known that I, ALBERT G. PERKINS, a citizen of the United States, and residing at Buffalo, in the county of Erie and State of New York, have invented new and useful Improvements in Pipe Joints, of which the following is a specification.

This invention relates generally to a pipe-joint or coupling but more particularly to a coupling designed for use in connection with concrete piping and conduits.

One of its objects is to provide a simple and inexpensive joint of this type which permits of expeditiously coupling and uncoupling sections of concrete pipe without mutilating or injuring them in any way.

A further object of the invention is the provision of a joint having the necessary flexibility to compensate for expansion and contraction of the concrete pipe-sections and also to permit them to assume a more or less angular position relative to each other, in order to adapt themselves to irregularities of the ground without causing leakage.

Other objects are to provide a reliable joint of this character which can be made on the job and which can be used under water.

In the accompanying drawings:

Figure 1 is a fragmentary side elevation of two pipes showing my improved coupling applied thereto. Figure 2 is a central longitudinal section thereof. Figure 3 is a cross-section on line 3—3, Fig. 2. Figure 4 is a detailed sectional view of a modified form of the improvement.

Similar characters indicate corresponding parts throughout the several views.

In the preferred embodiment of the invention shown in Figs. 1 to 3 inclusive, the numerals 10, 10 indicate the concrete pipe-sections connected by my improved joint or coupling. The opposing ends of these pipe-sections meet in a scarf or rabbet joint 11, as shown, the ends of the respective sections terminating in interlocking annular flanges 12, 12 for this purpose.

At their opposing ends, the pipe-sections 10—10 are provided with male coupling members which are preferably in the form of metallic bands or rings substantially L-shaped in cross-section. Each of said bands includes a base or attaching portion 13 which may be embedded or otherwise anchored in the end of the respective pipe-section, and an outwardly-extending circular flange or tongue 14 which is disposed transversely or at right angles to the longitudinal axis of the pipe-section and in the plane of the joint-edges and which extends a suitable distance beyond the exterior surface of the same. These flanged-bands are constructed of a malleable or pliant material, preferably copper.

The numeral 15 indicates a female coupling member in the form of a split clamping ring or collar which is adapted to engage the opposing tongue-portions 14 of the male coupling members, whereby said tongue-portions are drawn snugly together to form a tight joint and positively held against pulling apart. This clamping collar is likewise constructed of copper or similar material and is provided on its inner face with a circumferential groove 16 for engagement with the tongues 14. A packing 18 of lead or similar material is preferably placed between the flanges 14 of the male coupling members to effectually cork or seal the joint between such flanges.

In the assembly of the pipe-sections, they are placed end to end with their annular tongues disposed side by side with the packing 18 between them. The clamping ring 15 is now fitted around the tongues with the latter engaging the annular groove thereof. The sides of the ring are then rolled or pinched by hydraulic pressure or otherwise about the sides of the tongues so as to firmly grip or compress them, the packing 18 being likewise compressed and crowded into the coupling ring groove 16 to produce a reliable leak-proof joint capable of withstanding high pressures. By this one operation, the pipe sections are drawn uniformly and tightly together without in any way mutilating or otherwise doing injury to the concrete pipe.

This improved joint or coupling, which is primarily intended for use with concrete pipes and conduits such as are employed in high pressure water lines, is manifestly simple, compact and inexpensive in construction; it permits of assembling and dismembering of the pipe-sections in a minimum period of time; and separate fastenings and screw joints are eliminated. Furthermore, this coupling possesses the necessary flexibility to expand and contract in response to temperature changes and ground vibrations and to adapt itself to misalinement of the pipe-sections and irregularities of the ground, and it also lends itself for use under water.

If desired, the jointed ends of the pipe-sections may be reduced on their peripheries to form an external groove 17 as shown in Fig. 4, for receiving the opposing tongues 14 and clamping collar 15 of the coupling, whereby such parts are flush with the exterior surface of the pipe-sections.

A suitable packing or gasket 18 may be employed between the opposing flanges 14 of the coupling rings to insure a waterproof joint.

The term "pipe-structure," used in the claims, refers to the body of the pipe as a whole, formed of the jointed or coupled pipe-sections.

I claim as my invention:

1. In a flexible joint for concrete pipes, the combination of a pair of concrete pipe-sections, each provided at its ends with coupling rings of flexible metal, each ring comprising a base portion embedded in the concrete pipe-section and a flange projecting therefrom, and clamping means connecting the opposing flanges of the pipe-sections, said clamping means and the portion of said ring-flanges engaged thereby being clear of and unimbedded in the pipe-structure, permitting the flanges to flex freely to compensate for misalinement of the sections.

2. In a flexible joint for concrete pipes, the combination of a pair of concrete pipe-sections, each provided at its ends with coupling rings of malleable metal, each ring comprising a base portion embedded in the concrete pipe-section and an annular flange all portions of which project radially outward from said base-portion beyond the adjoining end of the pipe-section and a clamping ring of malleable metal embracing the opposing flanges of the pipe-sections and adapted to be compressed about the same, said clamping ring and the portions of said flanges embraced by it being clear of and unimbedded in the pipe-structure, permitting the flanges to flex freely to compensate for misalinement of the sections.

3. In a flexible joint for concrete pipes, the combination of a pair of concrete pipe-sections, metallic coupling members secured to the opposing ends of the pipe-sections and having opposed annular flexible flanges of malleable metal, all portions of which project outwardly from said ends, a soft packing interposed between said coupling flanges, and a clamping ring of malleable material embracing said flanges and having a groove in its inner face for receiving them, said clamping ring being compressed about the coupling flanges and the packing to integrally unite them to form a fluid-tight joint, said clamping ring and the portions of said flanges embraced by it being clear of and unimbedded in the pipe-structure, permitting the flanges to flex freely to compensate for misalinement of the sections.

ALBERT G. PERKINS.